United States Patent
Chou et al.

(10) Patent No.: US 7,620,761 B2
(45) Date of Patent: Nov. 17, 2009

(54) MULTI-FUNCTIONAL STORAGE APPARATUS AND CONTROL METHOD THEREOF

(75) Inventors: Bruce C. S. Chou, Hsin Chu (TW); Jer-Wei Chang, Hsin Chu (TW)

(73) Assignee: EGIS Technology Inc., Hsinchu (TW)

(*) Notice: Subject to any disclaimer, the term of this patent is extended or adjusted under 35 U.S.C. 154(b) by 117 days.

(21) Appl. No.: 11/905,134

(22) Filed: Sep. 27, 2007

(65) Prior Publication Data

US 2008/0082719 A1    Apr. 3, 2008

(30) Foreign Application Priority Data

Oct. 2, 2006    (TW)    ............... 95136491 A

(51) Int. Cl.
*H05K 7/10*    (2006.01)
(52) U.S. Cl. ............... 710/301; 710/8; 710/10; 713/186; 382/115; 382/124
(58) Field of Classification Search ............ 710/301, 710/8, 10, 19; 713/186, 189, 300, 320; 382/115, 382/124

See application file for complete search history.

(56) References Cited

U.S. PATENT DOCUMENTS

| | | | | |
|---|---|---|---|---|
| 6,754,725 | B1 * | 6/2004 | Wright et al. ............... | 710/8 |
| 6,980,673 | B2 * | 12/2005 | Funahashi ............... | 382/124 |
| 7,181,053 | B2 * | 2/2007 | Wang et al. ............... | 382/124 |
| 7,343,498 | B2 * | 3/2008 | Morrow ............... | 713/300 |
| 7,353,992 | B2 * | 4/2008 | Sugawara et al. ........... | 235/386 |
| 7,447,895 | B2 * | 11/2008 | Chiu et al. ............... | 713/2 |
| 7,447,911 | B2 * | 11/2008 | Chou et al. ............... | 713/186 |
| 7,461,266 | B2 * | 12/2008 | Chou ............... | 713/186 |
| 7,496,763 | B2 * | 2/2009 | Chiu et al. ............... | 713/186 |
| 2002/0126882 | A1 * | 9/2002 | Funahashi ............... | 382/124 |
| 2003/0204735 | A1 * | 10/2003 | Schnitzmeier ............... | 713/186 |
| 2005/0097338 | A1 * | 5/2005 | Lee ............... | 713/186 |
| 2005/0144464 | A1 * | 6/2005 | Chiu et al. ............... | 713/186 |
| 2005/0244037 | A1 * | 11/2005 | Chiu et al. ............... | 382/124 |
| 2006/0204047 | A1 * | 9/2006 | Dave et al. ............... | 382/115 |

(Continued)

OTHER PUBLICATIONS

CoSoSys Ltd. Carry it Easy +Plus Bio. Data Sheet. Version 2.1.8.4. 2007.*

(Continued)

*Primary Examiner*—Mark Rinehart
*Assistant Examiner*—Matthew D Spittle
(74) *Attorney, Agent, or Firm*—Muncy, Geissler, Olds & Lowe, PLLC

(57) ABSTRACT

A multi-functional storage apparatus and a control method thereof for executing the steps of: receiving a first command outputted from an operation system through a driver and responding to the first command to make the operation system identify an attribute of the multi-functional storage apparatus; transferring an application program stored in a storage device of the multi-functional storage apparatus according to an executing request of the operation system; executing, by the operation system, the application program to generate a second command, wherein the first command and the second command pertain to a control transfer command (CTC) for enabling a control transfer; and receiving the second command to control a signal generator of the multi-functional storage apparatus to generate an external signal, transferring the external signal back to the operation system; and converting the CTC into a bulk transfer command (BTC) for enabling a bulk transfer.

9 Claims, 2 Drawing Sheets

U.S. PATENT DOCUMENTS

2006/0288182 A1* 12/2006 Chou et al. .................. 711/163
2006/0294359 A1* 12/2006 Chou et al. .................... 713/2
2007/0180167 A1* 8/2007 Tan et al. ...................... 710/74

OTHER PUBLICATIONS

Memory Experts International. Biometric Security and Convenience. Press Release. Feb. 19, 2004.*

RiTech International. Bioslimdisk Encrypted Biometric USB Storage Device Solution. Press Release. Apr. 12, 2009.*

Davis et al. A Biometric Access Personal Optical Storage Device. IEEE. 2006.*

* cited by examiner

MULTI-FUNCTIONAL STORAGE APPARATUS AND CONTROL METHOD THEREOF

BACKGROUND OF THE INVENTION

1. Field of Invention

The invention relates to a multi-functional storage apparatus and a control method thereof, and more particularly to a multi-functional storage apparatus, which has an external signal generator and can be accessed in a non-administrative mode of an operation system, and a control method thereof.

2. Related Art

A conventional portable storage apparatus is usually designed to possess the function of plug-and-play so that the user may easily use this apparatus. An operation system, such as "Windows XP", has a built-in driver for a USB storage device, for example. Thus, the user can use the USB storage device in a computer host having the operation system of "Windows XP" without installing the USB storage device driver personally.

The basic architecture of this portable USB storage device includes a USB controller and a storage device, such as a flash memory, a hard disk drive or an optical disk.

In the operation system of "Windows XP", an administrative mode and a non-administrative mode are provided in order to prevent the other non-administrative user from installing AP software or hardware driver. In the administrative mode, an administrator can install the software for the hardware so that the software can control the operation of the hardware after he or she logs in the computer.

For example, when a simple USB thumb disk (flash drive) is plugged into the computer host, the driver of the operation system of the computer host detects the USB thumb disk and then outputs a control transfer command (CTC) to the USB thumb disk so that the firmware of the USB thumb disk responds to the host system to make the operation system identify the existence of the USB thumb disk and then access the USB thumb disk. In the administrative mode and the non-administrative mode, the data in the USB thumb disk may be transferred to the computer host for execution. This is mainly because that the data access in the storage device is communicated through a bulk transfer command (BTC).

In the above-mentioned administrative and non-administrative modes, the standard USB storage device may be normally used for the data storage, copy, movement and deletion.

Illustrations will be made according to another example using the devices disclosed in the following commonly-assigned patent applications: (a) U.S. patent application Ser. No. 10/998,722 (US20050144464A1), filed on Nov. 30, 2004, and entitled "MEMORY STORAGE DEVICE WITH A FINGERPRINT SENSOR AND METHOD FOR PROTECTING THE DATA THEREIN"; (b) U.S. patent application Ser. No. 11/131,276 (US20050210271A1), filed on May 18, 2005, and entitled "ELECTRONIC IDENTIFICATION KEY WITH PORTABLE APPLICATION PROGRAMS AND IDENTIFIED BY BIOMETRICS AUTHENTICATION"; (c) U.S. patent application Ser. No. 11/115,212 (US20050244037A1), filed on Apr. 27, 2005 and entitled "PORTABLE ENCRYPTED STORAGE DEVICE WITH BIOMETRIC IDENTIFICATION AND METHOD FOR PROTECTING THE DATA THEREIN"; (d) U.S. patent application Ser. No. 11/332,167, filed on Jan. 17, 2006 and entitled "STORAGE DEVICE AND METHOD FOR PROTECTING DATA STORED THEREIN"; (e) U.S. patent application Ser. No. 11/444,393 (US20060288182A1), filed on Jun. 1, 2006, and entitled "PORTABLE STORAGE DEVICE CAPABLE OF AUTOMATICALLY RUNNING BIOMETRICS APPLICATION PROGRAMS AND METHODS OF AUTOMATICALLY RUNNING THE APPLICATION PROGRAMS"; and (f) U.S. patent application Ser. No. 11/585,872 (US20070098226A1), filed on Oct. 25, 2006, and entitled "HARD DISK APPARATUS WITH A BIOMETRICS SENSOR AND METHOD OF PROTECTING DATA THEREIN".

When the USB thumb disk embedded with a fingerprint sensor is plugged into the computer host, the driver of the operation system of the computer host detects the existence of the USB thumb disk, and then outputs the control transfer command (CTC) to the USB thumb disk so that the firmware of the USB thumb disk responds to the host system to make the operation system identify the existence of the USB thumb disk and thus access the storage device of the USB thumb disk. However, a certain partition in the storage device of the USB thumb disk cannot be accessed unless the user passes the fingerprint identification. In this case, a fingerprint matching AP is launched and enables the fingerprint sensor to scan the user's fingerprint image and execute the authentication process, and then the application program (AP) informs the command, which could be named as a media change command, to the firmware inside the USB controller to enable the data access authority of the certain partition after the fingerprint identification passes. The commands for image getting and media change pertain to special commands but not the BTC for the standard data access.

In the administrative mode, the operation system can accept the special command to execute the complete fingerprint identification procedure. For example, the operation system can communicate with the fingerprint sensor connected thereto through the USB controller so that a captured fingerprint image can be transferred to the computer for comparison or the application program (AP) stored in the thumb disk can be executed. In the non-administrative mode, however, the operation system does not allow the execution of the basic functions other than the standard data reading or writing. That is, only the bulk read and bulk write commands are allowed. For example, the OS can not let the USB controller send the fingerprint image via the fingerprint sensor scanning to the host computer because such behaviors do not pertain to the data storing or writing behavior for the standard storage medium, and the operation system does not allow such behaviors to be executed in the non-administrative mode. In other words, the BTC of the operation system only can command the USB storage device so that data reading and writing operations can be performed in the storage medium in the non-administrative mode, and the BTC is invalid with respect to the fingerprint sensor connected to the USB controller. That is, the fingerprint data cannot be normally transmitted to the computer, or the fingerprint sensor cannot communicate with other software being executed.

SUMMARY OF THE INVENTION

It is therefore an object of the invention to provide a multi-functional storage apparatus, which has an external signal generator and can be accessed in a non-administrative mode of an operation system, and a control method thereof. Thus, the conventional problem of the operation system of intercepting a control command of the external signal generator in the non-administrative mode can be solved.

To achieve the above-identified object, the invention provides a multi-functional storage apparatus to be connected to a computer host having an operation system, which has a driver for the multi-functional storage apparatus. The multi-functional storage apparatus includes a storage device, a signal generator and an interface controller. The storage device stores data and an application program. The signal generator generates an external signal according to external excitation. The interface controller is connected to the storage device and the signal generator and is to be connected to the computer host. The interface controller stores firmware, and the firmware and the application program are configured such that: the interface controller receives a first command outputted from the operation system through the driver, and responds to the first command to make the operation system identify an attribute of the multi-functional storage apparatus; the interface controller transfers the application program to the operation system according to an executing request of the operation system; the operation system executes the application program to generate a second command, wherein the first command and the second command pertain to a control transfer command (CTC) for enabling a control transfer; and the interface controller receives the second command to control the signal generator to generate the external signal and transfers the external signal back to the operation system, wherein the firmware converts the CTC into a bulk transfer command (BTC) for enabling a bulk transfer.

The invention also provides a method of controlling a multi-functional storage apparatus to be connected to a computer host having an operation system, which has a driver for the multi-functional storage apparatus. The method includes, after the multi-functional storage apparatus is connected to the computer host, the steps of: receiving a first command outputted from the operation system through the driver, and responding to the first command to make the operation system identify an attribute of the multi-functional storage apparatus; transferring an application program stored in a storage device of the multi-functional storage apparatus to the operation system according to an executing request of the operation system, wherein the operation system executes the application program to generate a second command, and the first command and the second command pertain to a control transfer command (CTC) for enabling a control transfer; receiving the second command to control a signal generator of the multi-functional storage apparatus to generate an external signal, and transferring the external signal back to the operation system; and converting the CTC into a bulk transfer command (BTC) for enabling a bulk transfer.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
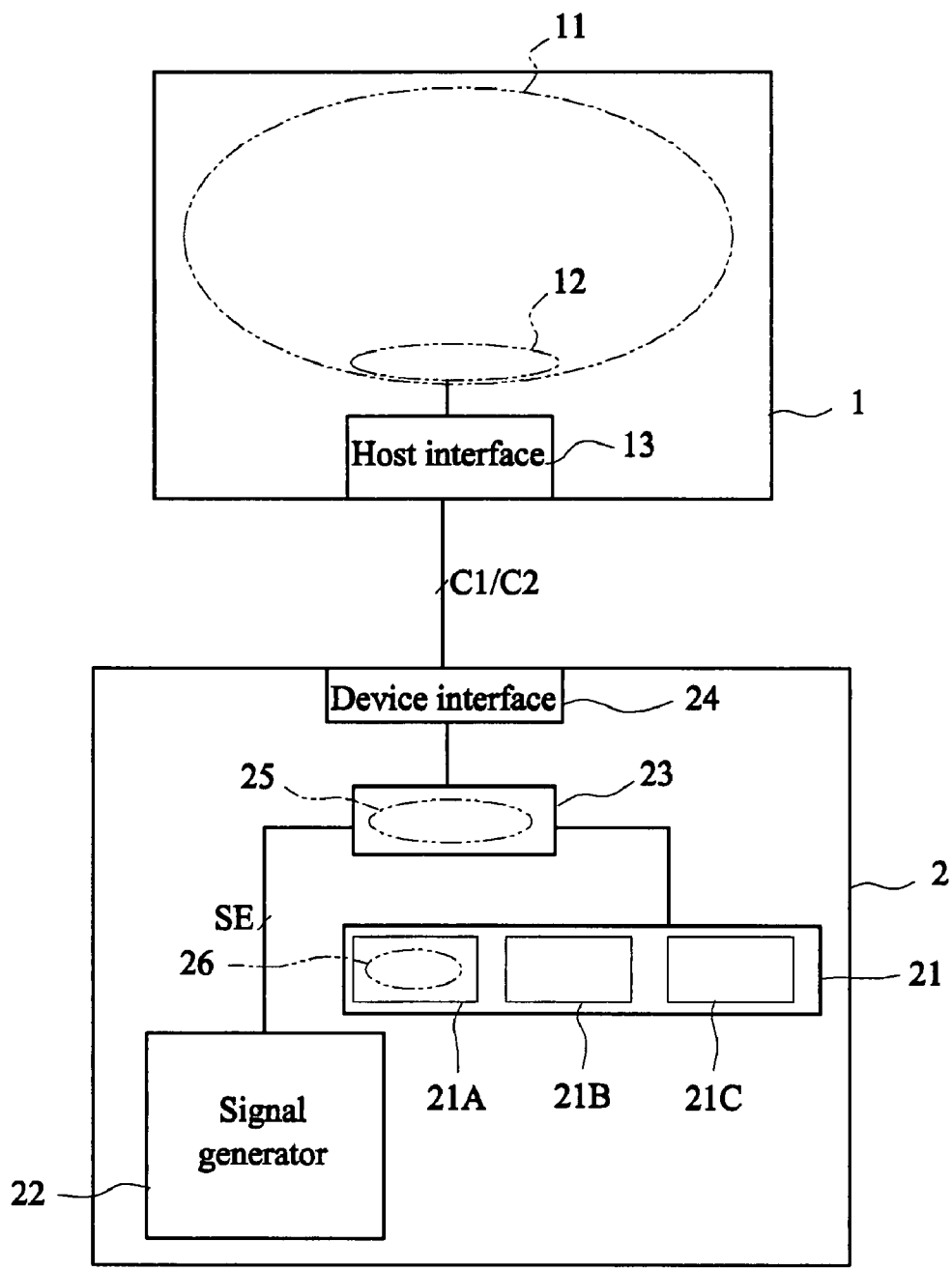
FIG. 1 is a schematic illustration showing a multi-functional storage apparatus connected to a computer host according to a preferred embodiment of the invention.

FIG. 1 is a schematic illustration showing a multi-functional storage apparatus 2 connected to a computer host according to a preferred embodiment of the invention. As shown in FIG. 1, the multi-functional storage apparatus 2 of this embodiment is to be connected to a computer host 1. The computer host 1 has a host interface 13, which also contains an interface controller, and an operation system 11, which has a driver 12 of the multi-functional storage apparatus 2. The multi-functional storage apparatus 2 includes a storage device 21, a signal generator 22, an interface controller 23 and a device interface 24.

The device interface 24 corresponds to the host interface 13 and is a universal serial bus (USB) interface in this embodiment, or may be a PCI-Express interface, an IEEE 1394 interface, a SATA interface or any other standard interface in another embodiment.

The storage device 21 stores data and an application program 26. The application program 26 may be built therein when the product is shipped out, or the user may store the application program 26 to the storage device 21 through an optical disk or the Internet. The storage device 21 may be a memory, a hard disk drive or an optical drive or any non-volatile storage medium.

In practice, the storage device 21 may be divided into a public block 21A, a security block 21B and a hidden block 21C. The application program 26 may be stored in the public block 21A. The security block 21B stores the data to be protected by the user. The hidden block 21C may store reference data, such as passwords or biometrics template data, for the identification of the user, and the reference data is the data mentioned hereinabove.

The signal generator 22 generates an external signal SE according to external excitation. The signal generator 22 may be a biometrics sensor (e.g., a fingerprint sensor), a microphone, an optical image sensor, or a smart card reader, or even a RF ID reader or any other signal generating device. The microphone and the optical image sensor may also serve as the biometrics sensor for sensing the user's biometrics data, such as the voice, the iris, the face and the capillary. The smart card reader may read the smart card or SIM card carried by the user. Thus, the application program 26 may enable or disable the security block 21B of the storage device 21 according to a result obtained after comparing the biometrics data with the external signal SE.

The interface controller 23 is connected to the storage device 21 and the signal generator 22 and is to be connected to the computer host 1. The interface controller 23 stores firmware 25. In this embodiment, the interface controller 23 is a USB controller.

The firmware 25 and the application program 26 are configured to execute the following operations. First, the interface controller 23 receives a first command C1 outputted from the operation system 11 through the driver 12, and responds to the first command C1 to make the operation system 11 identify an attribute of the multi-functional storage apparatus 2. Then, the interface controller 23 transfers the application program 26 to the operation system 11 according to an executing request of the operation system 11. This executing request may be generated after the user clicks to execute the application program, or the firmware 25 may cause the operation system 11 to generate the executing request so that the plug-and-play function and the function of automatically executing the application program can be obtained. Next, the operation system 11 executes the application program 26 to generate a second command C2. In order to solve the problem that the conventional operation system in the non-administrative mode only can communicate with the USB storage device through the standard BTC command for enabling the bulk transfer, the invention can effectively break through the limitation under the non-administrative mode using the specific command architecture, which is pre-defined in the AP and the firmware. In detail, the non-standard reading or writing command for the signal generator 22 is changed to the CTC command for communication (also including the media change command) in the non-administrative mode according to the communication protocols of the CTC command.

In one embodiment, the communication may be performed using the standard CTC command, and according to the communication protocols pre-defined in the AP and the firmware. In another embodiment, the CTC command may have the BTC command packaged therein, and the BTC command is then separated therefrom using the pre-defined firmware. In brief, the first command C1 and the second command C2 pertain to the control transfer command (CTC) for enabling a control transfer. Finally, the interface controller 23 receives the second command C2 to control the signal generator 22 to generate the external signal SE and to transfer the external signal SE back to the operation system 11. Taking the fingerprint sensor as an example, the second command C2 controls the sensor to read the fingerprint image and then transfer the fingerprint image to the computer system for identification. Thus, the security block 21B may be enabled and then accessed after the identification passes.

Figure 2:
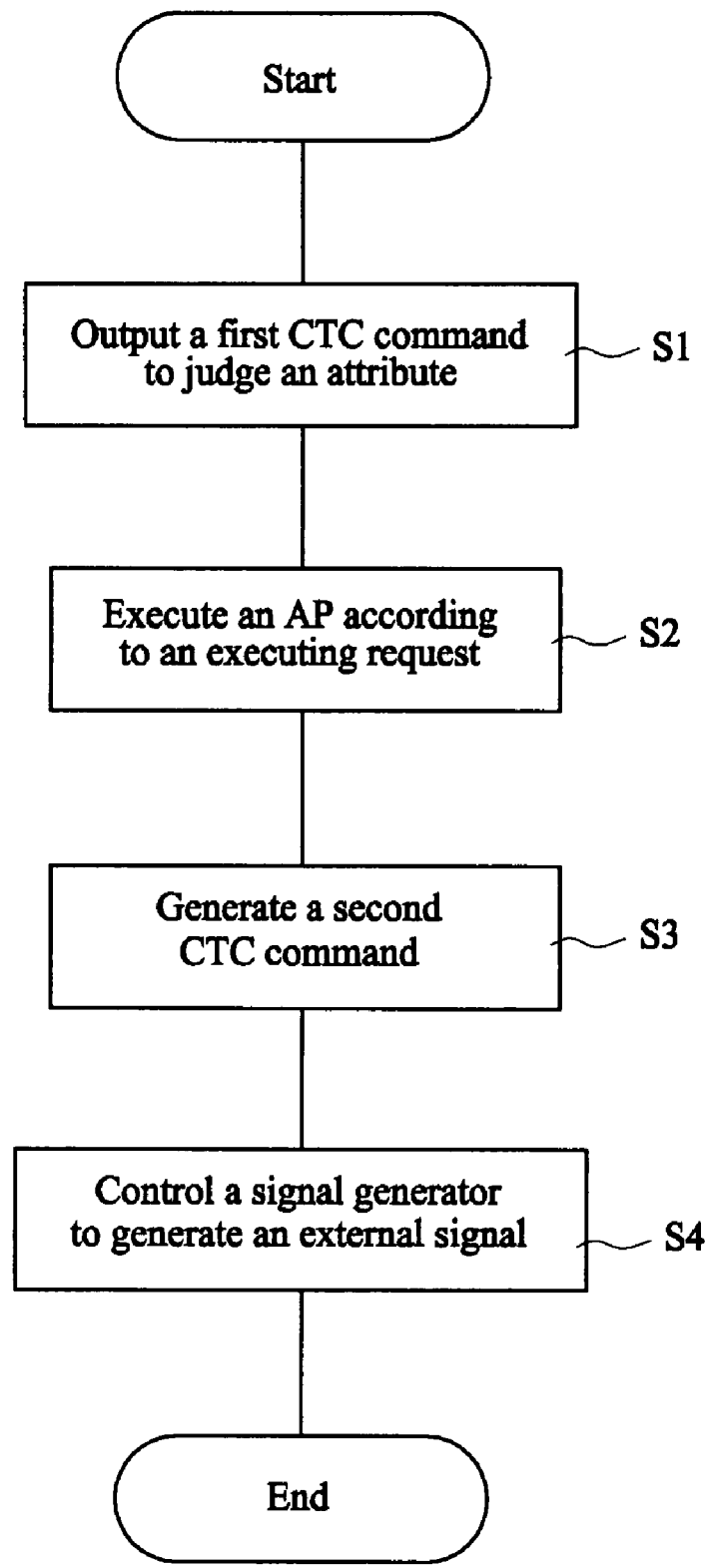
FIG. 2 is a flow chart showing a control method of the multi-functional storage apparatus according to the preferred embodiment of the invention.

FIG. 2 is a flow chart showing a control method of the multi-functional storage apparatus according to the preferred embodiment of the invention. As shown in FIG. 2, the control method of the multi-functional storage apparatus is applied to the multi-functional storage apparatus. The control method includes steps S1 to S4 after the multi-functional storage apparatus 2 is connected to the computer host 1.

In step S1, a first CTC command is outputted to judge the attribute. The multi-functional storage apparatus receives the first command C1 outputted from the operation system 11 through the driver 12, and responds with the first command C1 to make the operation system 11 identify the attribute of the multi-functional storage apparatus 2.

In step S2, the application program is executed according to the executing request. The multi-functional storage apparatus transfers the application program 26 stored in the storage device 21 of the multi-functional storage apparatus 2 to the operation system 11 according to the executing request of the operation system 11. The firmware 25 of the multi-functional storage apparatus may cause the operation system 11 to generate the executing request.

In step S3, a second CTC command is generated. The operation system 11 executes the application program 26 to generate the second command C2. The first command C1 and the second command C2 pertain to the control transfer command (CTC) for enabling the control transfer.

In step S4, the signal generator 22 is controlled to generate the external signal SE. The multi-functional storage apparatus receives the second command C2 to control the signal generator 22 of the multi-functional storage apparatus 2 to generate the external signal SE and to transfer the external signal SE back to the operation system 11.

According to the embodiment of the invention, the function of the signal generator of the multi-functional storage apparatus may be enabled in the non-administrative mode so that the security block of the multi-functional storage apparatus may be enabled after the identification passes.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A multi-functional storage apparatus to be connected to a computer host having an operation system, which has a driver for the multi-functional storage apparatus, the multi-functional storage apparatus comprising:
 a storage device far storing data and an application program;
 a signal generator for generating an external signal according to external excitation; and
 an interface controller, which is connected to the storage device and the signal generator and is to be connected to the computer host, wherein the interface controller stores firmware, and the firmware and the application program are configured such that:
 the interface controller receives a first command outputted from the operation system through the driver, and responds to the first command to make the operation system identify an attribute of the multi-functional storage apparatus;
 the interface controller transfers the application program to the operation system according to an executing request of the operation system;
 the operation system executes the application program to generate a second command, wherein the first command and the second command pertain to a control transfer command (CTC) for enabling a control transfer; and
 the interface controller receives the second command to control the signal generator to generate the external signal and transfers the external signal back to the operation system, wherein the firmware converts the CTC into a bulk transfer command (BTC) for enabling a bulk transfer.

2. The apparatus according to claim 1, wherein the firmware causes the operation system to generate the executing request.

3. The apparatus according to claim 1, wherein the signal generator is a biometrics sensor.

4. The apparatus according to claim 1, wherein the data is biometrics data stored in a hidden block of the storage device, the application program is stored in a public block of the storage device, and a security block of the storage device is enabled or disabled according to a result obtained by comparing the biometrics data with the external signal.

5. The apparatus according to claim 1, wherein the signal generator is a fingerprint sensor, a microphone, an optical image sensor, or a card reader.

6. The apparatus according to claim 1, wherein the interface controller is a universal serial bus (USB) controller.

7. The apparatus according to claim 1, wherein the storage device is a memory, a hard disk drive, an optical drive or a non-volatile storage medium.

8. A method of controlling a multi-functional storage apparatus to be connected to a computer host having an operation system, which has a driver for the multi-functional storage apparatus, the method comprising, after the multi-functional storage apparatus is connected to the computer host, the steps of:

receiving a first command outputted from the operation system through the driver, and responding to the first command to make the operation system identify an attribute of the multi-functional storage apparatus;

transferring an application program stored in a storage device of the multi-functional storage apparatus to the operation system according to an executing request of the operation system, wherein the operation system executes the application program to generate a second command, and the first command and the second command pertain to a control transfer command (CTC) for enabling a control transfer;

receiving the second command to control a signal generator of the multi-functional storage apparatus to generate an external signal, and transferring the external signal back to the operation system; and converting the CTC into a bulk transfer command (BTC) for enabling a bulk transfer.

9. The method according to claim 8, wherein firmware of the multi-functional storage apparatus causes the operation system to generate the executing request.

* * * * *